United States Patent
Takeshi (10) Patent No.: US 10,019,155 B2
(45) Date of Patent: Jul. 10, 2018

(54) TOUCH CONTROL PANEL FOR VEHICLE CONTROL SYSTEM

(71) Applicant: HONDA MOTOR CO., LTD., Tokyo (JP)

(72) Inventor: Nobuteru Takeshi, Tochigi (JP)

(73) Assignee: Honda Motor Co., Ltd., Tokyo (JP)

(*) Notice: Subject to any disclaimer, the term of this patent is extended or adjusted under 35 U.S.C. 154(b) by 840 days.

(21) Appl. No.: 14/318,895

(22) Filed: Jun. 30, 2014

(65) Prior Publication Data

US 2015/0378598 A1 Dec. 31, 2015

(51) Int. Cl.
G06F 3/0488 (2013.01)
G06F 3/0482 (2013.01)
G06F 3/0484 (2013.01)
G06F 3/0354 (2013.01)
G06F 3/01 (2006.01)

(52) U.S. Cl.
CPC .......... *G06F 3/04886* (2013.01); *G06F 3/016* (2013.01); *G06F 3/03547* (2013.01); *G06F 3/0482* (2013.01); *G06F 3/04842* (2013.01); *B60K 2350/1004* (2013.01)

(58) Field of Classification Search
CPC .................................................. G06F 3/04886
USPC ......................................................... 715/773
See application file for complete search history.

(56) References Cited

U.S. PATENT DOCUMENTS

| | | | |
|---|---|---|---|
| 4,914,624 A * | 4/1990 | Dunthorn | G06F 3/04886 345/173 |
| 6,373,463 B1 | 4/2002 | Beeks | |
| 7,084,859 B1 * | 8/2006 | Pryor | G01C 21/3664 345/156 |
| 7,170,428 B2 | 1/2007 | Himberg et al. | |
| 7,548,232 B2 | 6/2009 | Shahoian et al. | |
| 7,714,849 B2 | 5/2010 | Pryor | |
| 7,728,820 B2 | 6/2010 | Rosenberg et al. | |
| 7,808,488 B2 | 10/2010 | Martin et al. | |
| 8,031,181 B2 | 10/2011 | Rosenberg et al. | |
| 8,049,734 B2 | 11/2011 | Rosenberg et al. | |
| 8,232,969 B2 | 7/2012 | Grant et al. | |
| 8,344,686 B2 | 1/2013 | Gaul et al. | |
| 8,406,961 B2 | 3/2013 | Pathak et al. | |
| 8,471,689 B2 | 6/2013 | Zaborowski | |
| 8,633,916 B2 | 1/2014 | Bernstein et al. | |
| 2005/0253816 A1 | 11/2005 | Himberg et al. | |

(Continued)

FOREIGN PATENT DOCUMENTS

EP 2264564 A1 12/2010

*Primary Examiner* — Doon Chow
*Assistant Examiner* — Conrad Pack
(74) *Attorney, Agent, or Firm* — Armstrong Teasdale LLP (57) ABSTRACT

A vehicle control system includes a display device located in a vehicle. The display device displays a plurality of display icons with one of the display icons representing an active display icon. A touchpad is located in the vehicle remote from the display device. The touchpad provides virtual buttons corresponding to the display icons that have relative orientations corresponding to the display icons. The touchpad establishes a home location on the touchpad based on a location where a user of the vehicle touches the touchpad. The home location corresponds to the active display icon such that the virtual button representing the active display icon is located at the home location and the other virtual buttons are oriented about the home location.

23 Claims, 6 Drawing Sheets

(56) References Cited

U.S. PATENT DOCUMENTS

| | | |
|---|---|---|
| 2006/0109256 A1 | 5/2006 | Grant et al. |
| 2009/0237364 A1 | 11/2009 | Bloomcamp et al. |
| 2010/0127996 A1* | 5/2010 | Kitahara ............ G01C 21/3688 345/173 |
| 2010/0231367 A1* | 9/2010 | Cruz-Hernandez ..... G06F 3/016 340/407.2 |
| 2010/0268426 A1* | 10/2010 | Pathak ................ G06F 3/03547 701/48 |
| 2010/0302190 A1 | 12/2010 | Yeh |
| 2011/0126153 A1* | 5/2011 | Park .................... G06F 3/04886 715/810 |
| 2011/0138416 A1* | 6/2011 | Kang .................... G06F 3/0482 725/39 |
| 2011/0193813 A1 | 8/2011 | Gralewski |
| 2011/0304550 A1* | 12/2011 | Romera Jolliff ........ G06F 3/016 345/168 |
| 2012/0013548 A1 | 1/2012 | Choi et al. |
| 2012/0056838 A1 | 3/2012 | Harris et al. |
| 2012/0056839 A1 | 3/2012 | Rosenberg et al. |
| 2012/0113001 A1* | 5/2012 | Yamauchi ............... G06F 3/038 345/157 |
| 2012/0161702 A1 | 6/2012 | Kim |
| 2012/0242581 A1 | 9/2012 | Laubach |
| 2012/0330494 A1 | 12/2012 | Hendrix et al. |
| 2013/0127417 A1 | 5/2013 | Karner et al. |
| 2013/0162221 A1 | 6/2013 | Jefferies et al. |
| 2013/0179061 A1 | 7/2013 | Gadh et al. |
| 2013/0231818 A1 | 9/2013 | Saito |
| 2013/0307475 A1 | 11/2013 | Kishiyama et al. |
| 2013/0307796 A1* | 11/2013 | Liu ......................... G06F 3/041 345/173 |
| 2014/0002386 A1 | 1/2014 | Rosenberg et al. |
| 2014/0009403 A1 | 1/2014 | Tremblay et al. |
| 2014/0053189 A1* | 2/2014 | Lee ..................... H04N 21/4858 725/37 |
| 2015/0019967 A1* | 1/2015 | Gutentag ............. G06F 3/0488 715/719 |
| 2015/0033188 A1* | 1/2015 | Devi ..................... G06F 3/0482 715/824 |
| 2015/0312617 A1* | 10/2015 | Chen ..................... G06F 3/0383 348/734 |
| 2015/0355710 A1* | 12/2015 | Modarres ............... G09G 5/003 345/173 |

\* cited by examiner

TOUCH CONTROL PANEL FOR VEHICLE CONTROL SYSTEM

BACKGROUND

The present disclosure relates generally to a touch control panel for a vehicle control system.

Existing systems and methods for vehicle control systems provide interaction between a human operator of a vehicle and system components within the vehicle via a user interface that allows for control of different operations. For example, touch sensitive devices such as touchpads or touchpads allow user selection of different controls or operations, such as to control one or more functions of the vehicle. However, conventional touchpads and touchpads for vehicles have specific function commands mapped to pre-determined locations of the touchpads or touchpads. Conventional touchpads and touchpads are also typically flat, providing no non-visual feedback to the user. Non-visual feedback may allow a user to select a function without taking his/her eyes off of the road.

BRIEF DESCRIPTION

In one embodiment, a vehicle control system is provided that includes a display device located in a vehicle. The display device displays a plurality of display icons with one of the display icons representing an active display icon. A touchpad is located in the vehicle remote from the display device. The touchpad provides virtual buttons corresponding to the display icons that have relative orientations corresponding to the display icons. The touchpad establishes a home location on the touchpad based on a location where a user of the vehicle touches the touchpad. The home location corresponds to the active display icon such that the virtual button representing the active display icon is located at the home location and the other virtual buttons are oriented about the home location.

Optionally, the locations of the virtual buttons are not fixed at pre-set locations relative to the touchpad. The locations of the virtual buttons may be centered about the home location each time the user touches the touchpad. The locations of the virtual buttons may change when a new display icon becomes the active display icon.

Optionally, the touchpad may include a top, a bottom, a right side and a left side. The touchpad may establish the home location at any location relative to the top, bottom, right side and left side based on where the user of the vehicle touches the touchpad. Optionally, at a first touch, the touchpad may establish the home location closer to the right side than the left side such that the virtual button associated with the active display icon is positioned closer to the right side than the left side. At a second touch, the touchpad may establish the home location closer to the left side than the right side such that the virtual button associated with the active display icon is positioned closer to the left side than the right side. Optionally, at a first touch, the touchpad may establish the home location closer to the top than the bottom such that the virtual button associated with the active display icon is positioned closer to the top than the bottom. At a second touch, the touchpad may establish the home location closer to the bottom than the top such that the virtual button associated with the active display icon is positioned closer to the bottom than the top.

Optionally, the touchpad may sense a swipe action by the user along the touchpad from the virtual button representing the active display icon to an adjacent virtual button. The display device may activate the display icon associated with the adjacent virtual button to a new active display icon. A subsequent touch of the touchpad by the user may establish the home location on the touchpad corresponding to the new active display icon. The locations of the virtual buttons on the touchpad may remain fixed during the swipe action. The display device may highlight the active display icon to indicate to the user which display icon is the active display icon. The active display icon may become un-highlighted after the swipe action while the new active display icon may become highlighted after the swipe action.

Optionally, the display icons may be arranged in rows and in columns. The virtual buttons may be arranged in rows and in columns. The touchpad may provide fewer virtual buttons than display icons displayed on the display device.

Optionally, the touchpad may include a pressure sensor configured to sense a press action on the virtual button on the touchpad. The vehicle control system may execute a control function associated with the virtual button pressed during the press action. The touchpad may sense a press action on the virtual button on the touchpad. The display device may display different display icons after the press action and the touchpad may provide different virtual buttons associated with the display icons after the press action.

Optionally, the touchpad may provide tactile response to the user as the user moves along the virtual buttons on the touchpad. Optionally, when the user touches the touchpad, the virtual buttons are provided, but when the user does not touch the touchpad, the touchpad does not provide virtual buttons.

In a further embodiment, a method for controlling functions of a vehicle control system is provided that includes presenting, to a user of the vehicle, a first display on a display device. The first display displays a plurality of display icons corresponding to control functions of the vehicle control system and one of the display icons is an active display icon. The method includes receiving a touch input from the user on a touchpad of a control panel that is remote from the display device. The touch input establishes a home location. The method includes presenting, to the user of the vehicle, virtual buttons on the touchpad corresponding to the display icons. The virtual button corresponding to the active display icon is located at the home location and the virtual buttons corresponding to the other display icons are oriented relative to the home location.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for controlling functions of a vehicle control system are provided. It should be noted that although the various embodiments are described in connection with the automotive industry, such as for an automobile, one or more embodiments may be implemented in different industries and for different applications. Additionally, communication of information used in accordance with one or more embodiments may be performed with different types of communication protocols, as well as using different types of communication lines and communication buses.

One or more embodiments include a system, which may be implemented as a programmable logic controller (PLC), also referred to as a programmable logic circuit that controls various functions and operations of the vehicle, such as the climate control system, navigation system, information system, audio system, phone system, rear entertainment system, and the like. The controller may control display functions on one or more display devices or screens. The controller may monitor, receive and/or transmit one or more inputs or outputs between a display device and a control panel.

In various embodiments, the system may include a first display on a display device and a control panel of the vehicle with a touchpad that is remote from the first display. The control panel and the touchpad may be located such that an operator, or user, of the vehicle may easily touch the touchpad without being distracted from safely operating the vehicle. The first display on the display device may be located at a position higher than the touchpad, such that the operator may easily view the first display without being distracted from safely operating the vehicle. In alternative embodiments, the system may include a first display on a display device and a second display on a touchscreen of a control panel of the vehicle.

The system may receive input from the operator based on the operator selecting one of the various selectable mode controls or one of the various function controls. In some embodiments, the operator may select a control by touching the touchpad with a finger. The selectable function controls may include, but not be limited to, an audio control, a climate control, a navigational control, an information control, a phone control and a rear entertainment system control. In other embodiments, the selectable function controls may include additional, or a different, selectable function controls. The system may change the first display and/or the touchpad in response to the received input from the operator. The displays may be changed based on which one of the selectable mode controls or the function controls is selected.

Figure 1:
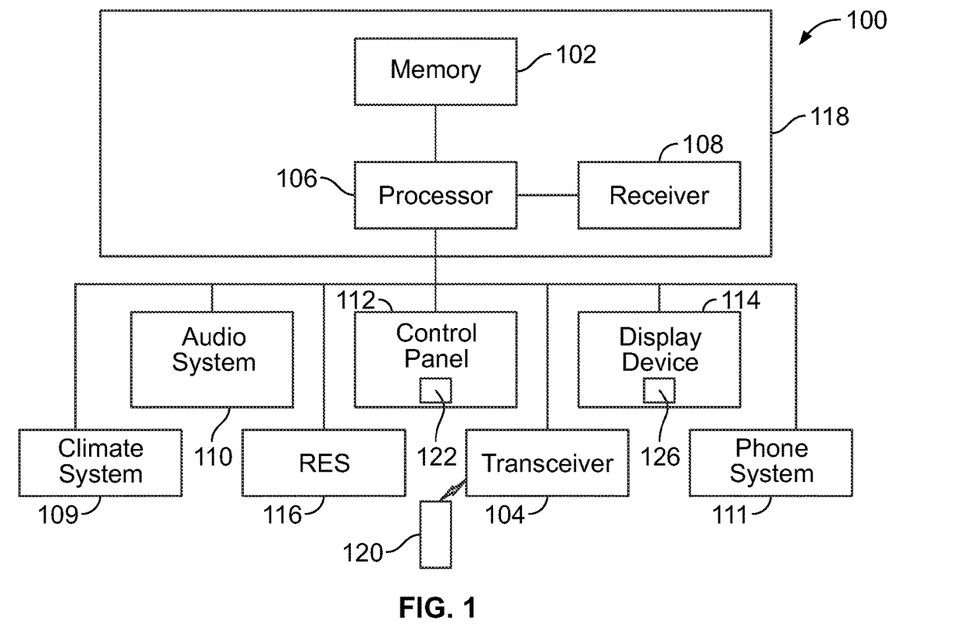
FIG. 1 is a block diagram of an exemplary vehicle control system consistent with various embodiments.

FIG. 1 illustrates a block diagram of an exemplary vehicle control system 100, consistent with various embodiments. The vehicle control system 100 may include a memory 102, a transceiver 104, a processor 106, a receiver 108, a climate control system 109, an audio system 110, a phone system 111, a control panel 112, a display device 114 and a rear entertainment system (RES) 116. In some embodiments, memory 102, transceiver 104, processor 106 and receiver 108 may be included in a computing device, such as a dedicated controller for the system 100 or into another component in the vehicle, such as a navigation system 118 of the vehicle.

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device. In some embodiments, the transceiver 104 may communicate wirelessly with the portable device 120 via a Bluetooth® (Bluetooth is a registered trademark of Bluetooth Sig., Inc. of Bellevue, Wash.) protocol. In other embodiments, another wireless protocol may be used. In some embodiments, the transceiver 104 may be included as part of the navigation system 118.

The receiver 108 may communicate with the processor 106 via the communication line and may receive information from one or more global positioning satellites, or another type of global positioning system. The audio system 110 may include one or more speakers for playing audio content. The RES 116 may be located such that passengers at a rear passenger location of a vehicle may be entertained. The RES 116 may include a display screen for displaying video or picture images and one or more speakers located at the rear passenger location of the vehicle.

The control panel 112 may communicate with the processor 106 via a communication line to transmit data to/from the control panel 112, such as for control of other modules or systems of the vehicle control system 100. The control panel 112 includes a touchpad 122 for receiving an input from a user for control of the vehicle control system 100. The touchpad 122 may display virtual buttons that may be touched by the user of the vehicle to control the vehicle control system 100. In an exemplary embodiment, the virtual buttons are created or formed on the touchpad 122 to give the touchpad 122 three-dimensional contours that provide tactile or haptic feedback to the user. Alternatively, the virtual buttons are created using vibrations or motions to simulate buttons on the touchpad 122 that provide tactile or haptic feedback to the user. Optionally, the virtual buttons may have icons on the touchpad 122 that are displayed and visible. The control panel 112 may have other input devices, such as other mechanical buttons around the touchpad 122 that may receive inputs for controlling the vehicle control system 100. The control panel 112 may have a dedicated control module or unit configured to process the control inputs and/or to process the data to be displayed on the display device 114 and/or the touchpad 122. Alternatively, such control functions may be processed by the processor 106.

The display device 114 may communicate with the processor 106 via a communication line to transmit data to/from the display device 114, such as for display of various information to the user of the vehicle. The display device 114 includes a display screen 126 for displaying information to the user. In an exemplary embodiment, the display device 114 is separate from the control panel 112, such as located at a different location in the vehicle. For example, the display device 114 can be positioned for convenient viewing by the user and the ouchpad 122 can be positioned within a comfortable distance from a hand of the user. The display screen 126 may display different icons, graphics, and the like than the touchpad 122. The virtual buttons on the touchpad 122 may correspond to and be mapped to the display icons on the display screen 126.

Figure 2:
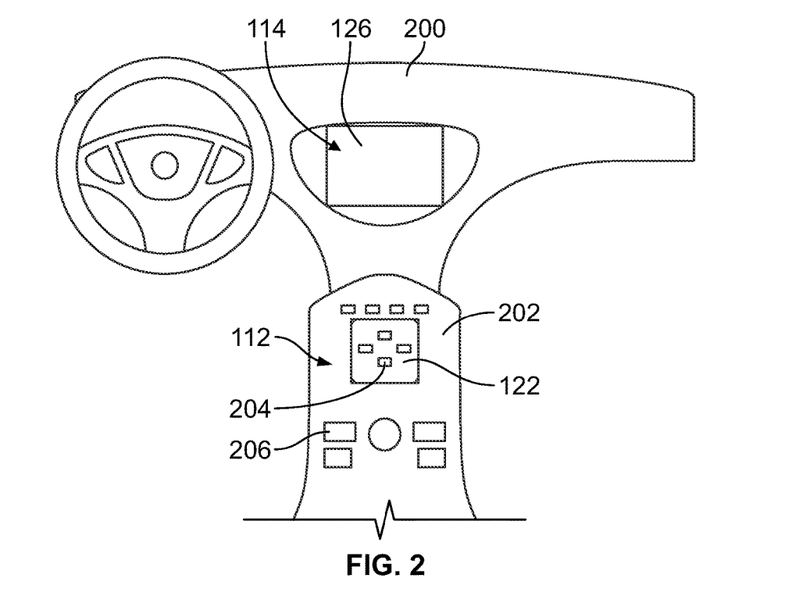
FIG. 2 illustrates positioning of some components of the vehicle control system shown in FIG. 1 within a vehicle in accordance with an exemplary embodiment.

FIG. 2 illustrates an arrangement of some components of the vehicle control system 100 within a vehicle in accordance with an exemplary embodiment. The vehicle includes a dashboard 200 and a center console 202. In an exemplary embodiment, the display device 114, including the display screen 126, is positioned at a central portion of the dashboard 200 such that a user, or an operator/driver, of a vehicle may easily view the display screen 126 without being distracted from operating the vehicle. The display screen 126 may be located close to eye level such that the user of the vehicle may view the display screen 126 while being able to peripherally view a roadway ahead. In other embodiments, the display screen 126 may be positioned at another location within the vehicle.

The control panel 112 may be located next to the user of the vehicle. The touchpad 122 is positioned to be easily reachable by the hand of the user while operating the vehicle. In some embodiments, the control panel 112 may be located in a center console area next to the user. The touchpad 122 allows the user to select icons displayed on the display screen 126 and associated functions. The control panel 112 may include selectable function controls 204 on the touchpad 122. For example, the selectable function controls 204 may be virtual buttons. The selectable function controls 204 may be pads, sliders, dials, and the like. In an exemplary embodiment, the selectable function controls 204 are not fixed in position on the touchpad 122, but rather may be positioned, centered or re-centered based on where the user touches the touchpad 122. Optionally, the control panel 112 may include fixed selectable function controls 206 that are exterior of the touchpad 122. For example, the controls 206 may be hard buttons, such as pads, sliders, knobs, dials and the like positioned around, such as above, below, along-side or elsewhere relative to the touchpad 122.

The control panel 112 is operably coupled to the display device 114, as well as the various sub-systems of the vehicle control system 100, such as the climate control system, navigation system, information system, audio system, phone system, rear entertainment system, and the like. For example, the control panel 112, the display device 114 and the components of the sub-systems may be operably coupled to the processor 106 (shown in FIG. 1).

The display device 114 may have a home menu or main menu having display icons corresponding to the various sub-systems. The control panel 112 is used to maneuver through the main menu, such as to activate control of one of the sub-systems. For example, the user may touch the touchpad 122 and navigate to activate the various function modes or sources and/or to activate various function controls associated with the modes or sources. Such activation or execution may be performed by selecting a virtual button on the touchpad 122 associated with one of the display icons to activate control of the mode or source associated with such sub-system.

Optionally, when one of the sub-systems is activated (e.g. by pressing on the touchpad 122), the display icons on the display device 114 may change, such as to represent various function controls of the selected sub-system. Optionally, when the display icons on the display device 114 change, the virtual buttons on the touchpad 122 correspondingly change. In an exemplary embodiment, as the function controls are selected and/or manipulated on the touchpad 122, the operation of the sub-system may be controlled, such as to change the radio station, to place a phone call, to change the fan speed or temperature of the climate control system, and the like.

Figure 3:
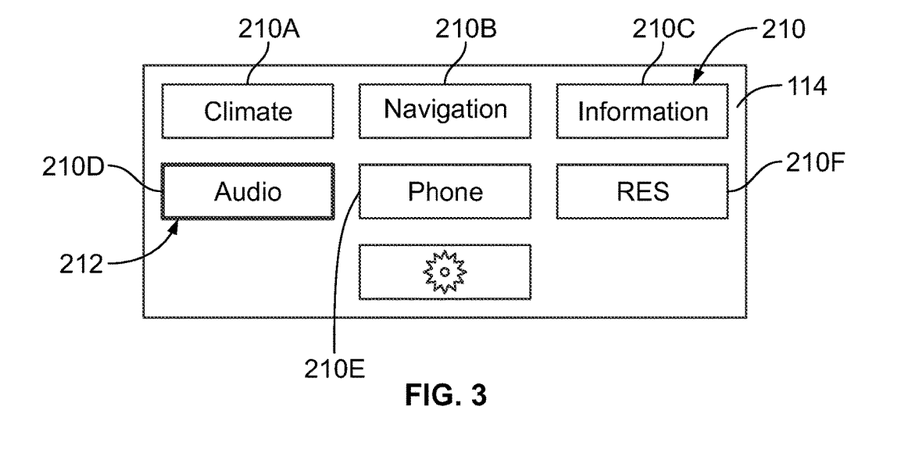
FIG. 3 illustrates an exemplary screenshot shown on the display device of the vehicle control system shown in FIG. 1.

FIG. 3 illustrates the display device 114 showing exemplary display icons 210 representing selectable function modes (or sources) and/or function controls of the vehicle control system 100 (shown in FIG. 1). For example, the display device 114 may have display icons 210 representing the various sub-systems of the vehicle control system, such as a climate control system display icon 210a, a navigation system display icon 210b, an information system display icon 210c, an audio system display icon 210d, a phone system display icon 210e, a rear entertainment system display icon 210f, and the like. Such arrangement of selectable control functions may represent a home menu or main menu that presents the user with the ability to access the main sub-systems of the vehicle control system 100.

The display icons 210 may include a menu icon to return to the previous menu or the main menu. The display icons 210 may include one or more favorite control functions. Optionally, the display icons 210 may be arranged in rows and columns. Other arrangements are possible in alternative embodiments, such as around a dial in a circular arrangement. In other embodiments, the display icons 210 associated with the various selectable function modes and/or function controls may be arranged in a different order, may include additional or fewer selectable function modes or controls, or may include a completely different set of selectable function modes or controls.

In an exemplary embodiment, one of the display icons 210 represents an active display icon 212. The active display icon 212 is indicated as such to the user, such as by highlighting the active display icon 212. Such highlighting may be highlighting of the entire active display icon 212, such as at a brighter display intensity, by highlighting the edges or perimeter of the active display icon 212, and the like. The user may change the active display icon 212 to a different display icon 210, such as by using the touchpad 122 of the control panel 112 (both shown in FIG. 2). The user may activate or select the function control associated with the active display icon 212 using the touchpad 122, such as by pressing on the touchpad 122 to select the function control. Optionally, once the function control of the sub-system associated with the active display icon 212 is selected, the vehicle control system 100 will allow operation and manipulation of various function controls within the selected sub-system. For example, the vehicle control system 100 changes the display icons 210 presented on the display device 114 to display icons 210 associated with such sub-system.

Figure 4:
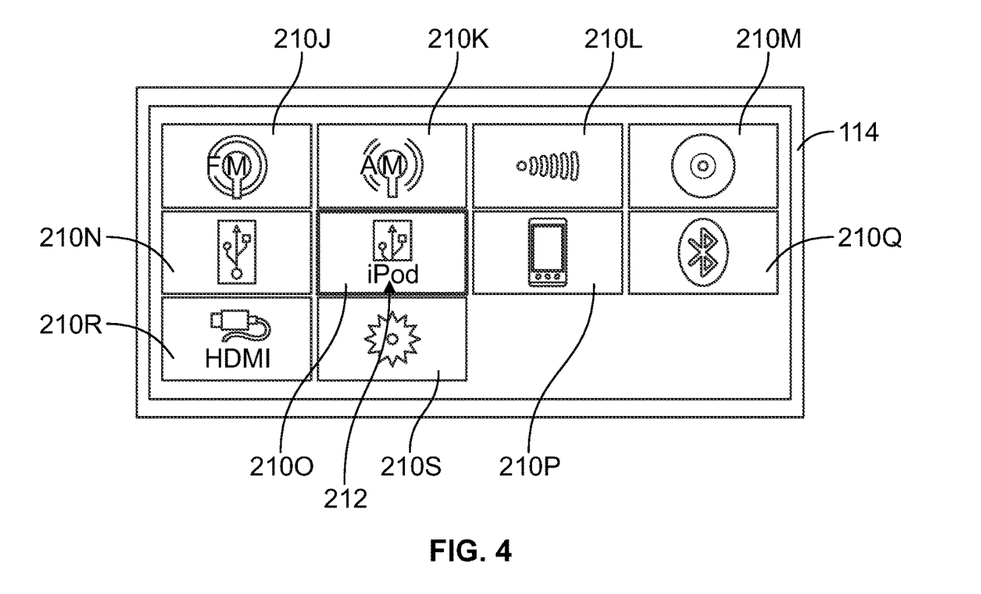
FIG. 4 illustrates the display device showing exemplary display icons.

FIG. 4 illustrates the display device 114 showing exemplary display icons 210 representing selectable function controls associated with the audio system of the vehicle control system 100. For example, the display device 114 may have display icons 210 representing FM output 210*j*, AM output 210*k*, satellite radio output 210*l*, CD output 210*m*, auxiliary USB output 210*n*, iPod® output 210*o* (iPod is a registered trademark of Apple Inc. of Cupertino, Calif.), mobile device output 210*p*, Bluetooth® output 210*q*, auxiliary HDMI output 210*r*, settings 210*s*, and the like. Such arrangement of selectable control functions may represent an audio output menu that presents the user with the ability to access further controls of the audio system, such as station selection, song selection, volume control, tune control, seek control, scan control and the like via a new menu. Other types of icons may be presented, such as when the vehicle control system 100 is in a different function mode, such as the climate control mode. For example, display icons 210 representative of a driver side temperature control, a front defroster control, a rear defroster control, a fan control, a recycled air control, an automatic mode HVAC control, a passenger side temperature control, and the like.

Optionally, the display icons 210 may be arranged in rows and columns. Other arrangements are possible in alternative embodiments, such as around a dial in a circular arrangement. In other embodiments, the display icons 210 associated with the various selectable function controls may be arranged in a different order, may include additional or fewer selectable function controls, or may include a completely different set of selectable function controls. In an exemplary embodiment, one of the display icons 210 represents the active display icon 212.

Figure 5:
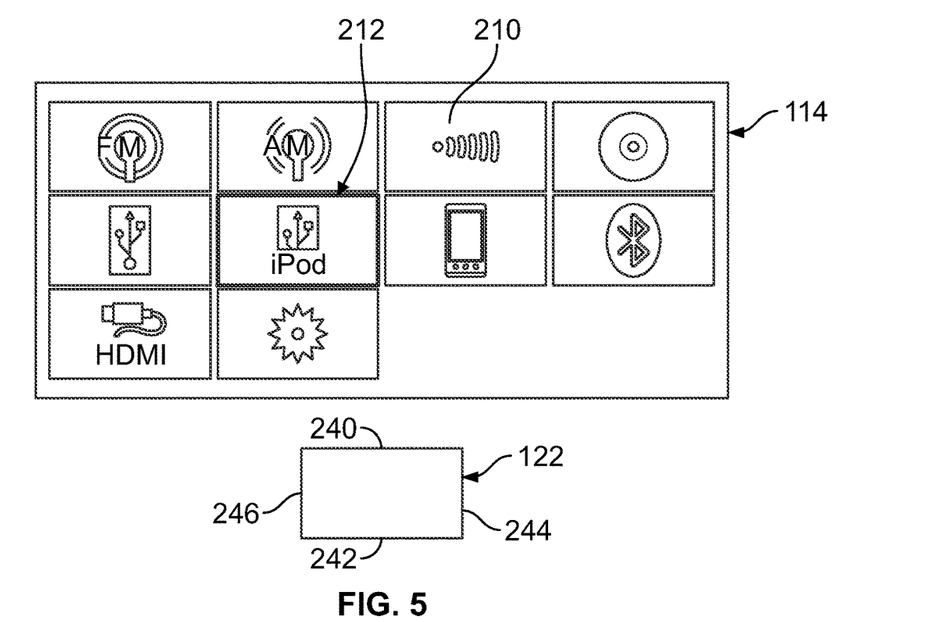
FIG. 5 illustrates the display device and a touchpad of the vehicle control system shown in FIG. 1 in accordance with an exemplary embodiment.
Figure 6:
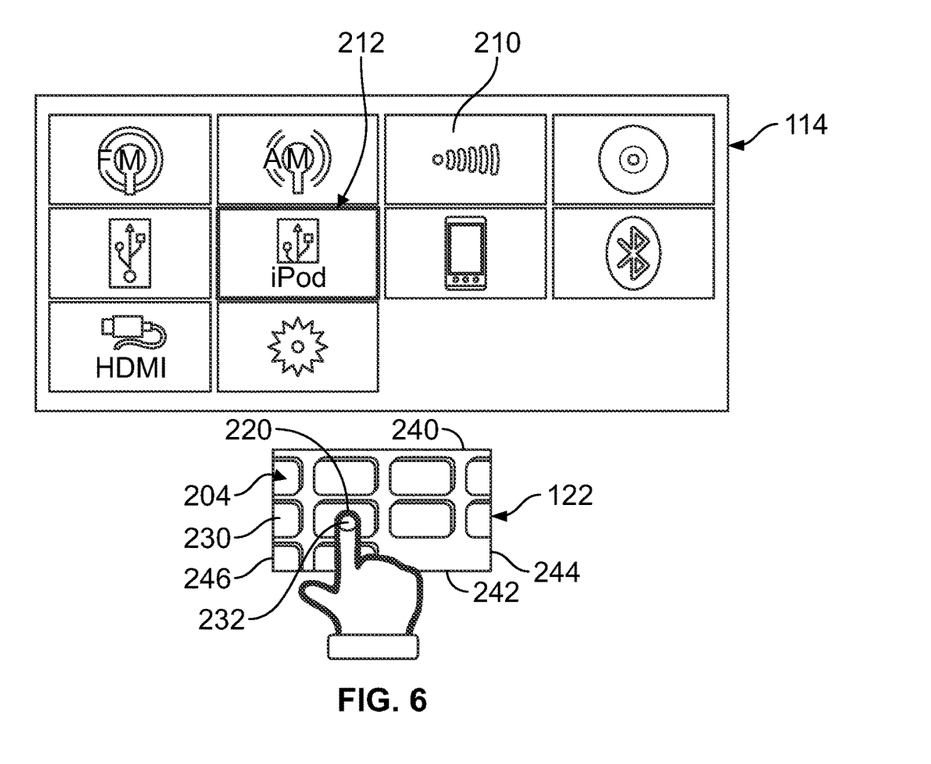
FIG. 6 illustrates the display device and the touchpad shown in FIG. 5 during a touching operation.

FIGS. 5 and 6 illustrate the display device 114 and the touchpad 122 during a touching operation. FIG. 5 shows the display device 114 and the touchpad 122 immediately prior to the user touching the touchpad 122. FIG. 6 shows the display device 114 and the touchpad 122 immediately after the user touches the touchpad 122.

In an exemplary embodiment, prior to the user touching the touchpad 122 (FIG. 5), the touchpad 122 does not provide any virtual buttons. The user is able to touch anywhere on the touchpad 122. After a touch input by the user on the touchpad 122 (represented by a tip of the user's finger 220 in FIG. 6), virtual buttons 230 are provided on the touchpad 122. The virtual buttons 230 may define the selectable function controls 204. When the user removes his/her finger from the touchpad 122, the touchpad 122 may again be devoid of the virtual buttons 230; however, in some embodiments, the virtual buttons 230 may remain for a predetermined period of time, such as 2 seconds, to allow the user to again touch the same virtual buttons 230 on the touchpad 122. In an exemplary embodiment, the virtual buttons 230 are created or formed on the touchpad 122 to give the touchpad 122 three-dimensional contours that provide tactile or haptic feedback to the user. For example, contours may be provided in the shape of a button. The contours may raise up out of the touchpad 122 to form the virtual buttons 230. Contours may be provided around the users finger, such as above, below and to both sides of the users finger to represent a virtual button 230. Alternatively, the virtual buttons 230 are created using vibrations or motions to simulate buttons on the touchpad 122 that provide tactile or haptic feedback to the user. Optionally, the touchpad 122 may additionally or alternatively be a touchscreen and the virtual buttons 230 may include icons on the touchpad 122 that are displayed and visible providing visual feedback in addition to the tactile or haptic feedback.

The virtual buttons 230 correspond to the display icons 210. The virtual buttons 230 have relative orientations corresponding to the display icons 210. For example, in the illustrated embodiment, the display icons 210 are oriented in rows and columns, and thus the virtual buttons 230 are correspondingly arranged in rows and columns. Other arrangements are possible in alternative embodiments, such as virtual buttons 230 arranged around a dial in a circular arrangement. The user may move to another virtual button 230 by swiping across the touchpad 122 to the desired virtual button 230. The virtual buttons 230 may have any size or shape that makes it convenient and easy for the user to select or move to the desired virtual button 230. For example, in the illustrated embodiment, the virtual buttons 230 are rectangular in shape, having defined edges with gaps or spaces therebetween. The spacing and positioning of the virtual buttons 230 may be different than the spacing and positioning of the display icons 210.

In an exemplary embodiment, the touchpad 122 establishes a home location 232 on the touchpad 122 at the location where the user first touches the touchpad 122. The home location 232 corresponds to the active display icon 212 such that the virtual button 230 representing the active display icon 212 is located at the home location 232 and the other virtual buttons 230 are oriented about the home location 232. For example, the virtual buttons 230 (representing the display icons 210 surrounding, for example, above, below and to the sides of the active display icon 212) may be centered around the home location 232 and the virtual button 230 associated with the home location 232. Because the virtual buttons 230 do not have pre-set positions relative to the physical perimeter of the touchpad 122 (however, the virtual buttons 230 may remain fixed while the user is touching the touchpad 122, such as during a swipe action), the user is able to touch anywhere on the touchpad 122 and then simply move from such location in the direction of the desired display icon 210 to change the active display icon 212. The user does not need to touch a particular location on the touchpad 122 (e.g., because the virtual buttons 230 are not in fixed, pre-set locations on the touchpad 122) and thus the user does not even need to look at the touchpad 122, which reduces glance down time and time that the user would otherwise not be looking at the road. The next time that the user touches the touchpad 122, the virtual buttons 230 may be in different orientations because the home location 232 may be different or because a different display icon 210 may be the active display icon 212.

The touchpad 122 includes a top 240, a bottom 242, a right side 244 and a left side 246. The locations of the virtual buttons 230 are not fixed relative to the top 240, bottom 242, right side 244 or left side 246, but rather are established based on the user defined home location 232. The user may establish the home location 232 at any location relative to the top 240, bottom 242, right side 244 or left side 246 and the home location 232 at subsequent touches may be in different locations relative to the top 240, bottom 242, right side 244 or left side 246. The touchpad 122 may provide fewer virtual buttons 230 than display icons 210. For example, the virtual buttons 230 may be enlarged to make it easier to maneuver from one virtual button 230 than the next. As such, the touchpad 122 may be made smaller than would otherwise be required to fit the virtual buttons 230 corresponding to all of the display icons 210. The virtual buttons 230 may at least partially overlap or hang off the top 240, bottom 242, right side 244 and/or left side 246. For example, the display device 114 may have more display icons 210 than fit on the touchpad 122, particularly if the home location 232 is set near one of the top 240, bottom 242, right side 244 or left side 246.

Figure 7:
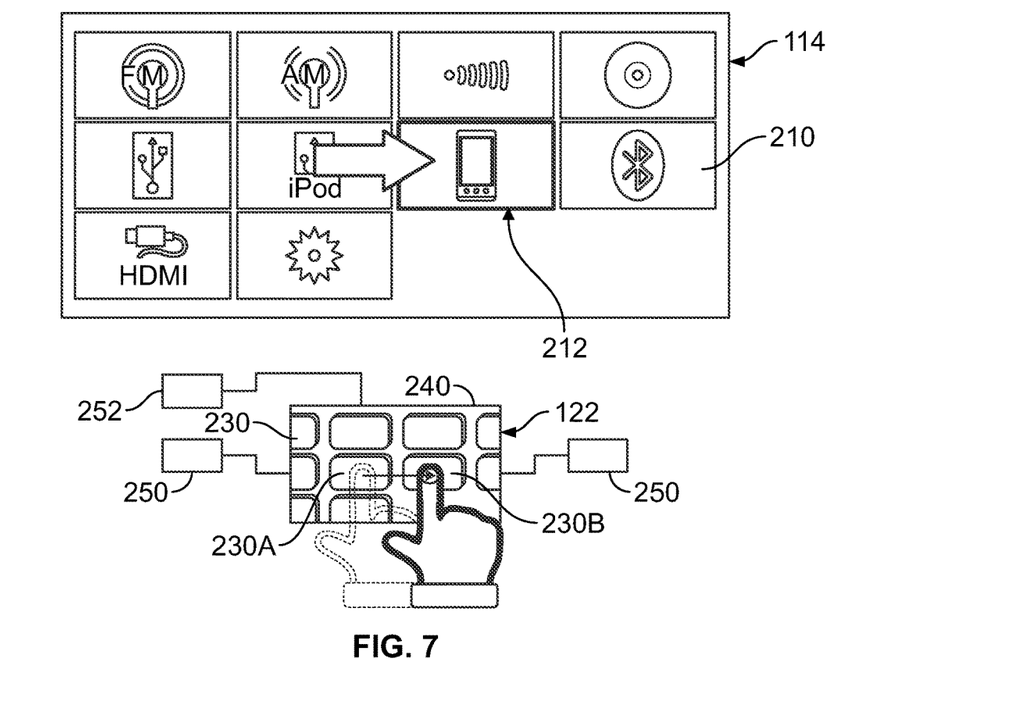
FIG. 7 illustrates the display device and the touchpad shown in FIG. 5 during another touching operation.

FIG. 7 illustrates the display device 114 and the touchpad 122 during another touching operation. FIG. 7 illustrates the display device 114 and the touchpad 122 during a swipe action where the user swipes his/her finger 220 across the touchpad 122 in the direction of another virtual button 230. For example, the user swipes his/her finger 220 from a base virtual button 230a to a target virtual button 230b. The base virtual button 230a may correspond to the active display icon 212 while the target virtual button 230b may correspond to a target display icon 212 that the user desires to make the active display icon 212. The user may then perform a new action, such as another swipe action to move to a new virtual button 230, a press action to activate the current virtual button 230, remove their finger 220 from the touchpad 122, or another type of action.

In an exemplary embodiment, the touchpad 122 includes one or more transducers 250 that provide tactile and/or audible feedback to the user as the user swipes along the touchpad 122. The tactile and/or audible feedback may correspond to the virtual buttons 230 such that the user is able to differentiate one virtual button 230 from the next virtual button 230. For example, as the user's finger 220 swipes along the edge of the virtual button 230, the transducer 250 may be activated to provide feedback to the user that the finger 220 is passing over the edge of the virtual button 230. In another exemplary embodiment, the virtual buttons 230 may be formed by providing contours on the surface of the touchpad 122 corresponding to the virtual buttons 230.

The display device 114 changes the display icons 210 during or after the swipe action. For example, as the user swipes to the adjacent virtual button 230, the old active display icon 212 becomes un-highlighted while the new active display icon 212 becomes highlighted. In an exemplary embodiment, if the user were to remove his/her finger 220 from the touchpad 122, the new active display icon 212 would remain highlighted on the display device 114 as the active display icon 212. The next touch of the touchpad 122 would use the new active display icon 212 as the home location for populating the touchpad 122 with the virtual buttons 230. Function control associated with the new active display icon 212 can be performed by selecting the new active display icon 212, such as by pressing on the virtual button 230 on the touchpad 122.

In an exemplary embodiment, the touchpad 122 includes a pressure sensor 252 for sensing press actions. When the user presses on one of the virtual buttons 230, the pressure sensor 252 senses the touch or pressure. The vehicle control system 100 recognizes such touch as being a press action corresponding to selection of the function control associated with the virtual button 230 and executes or implements the appropriate action.

Figure 8:
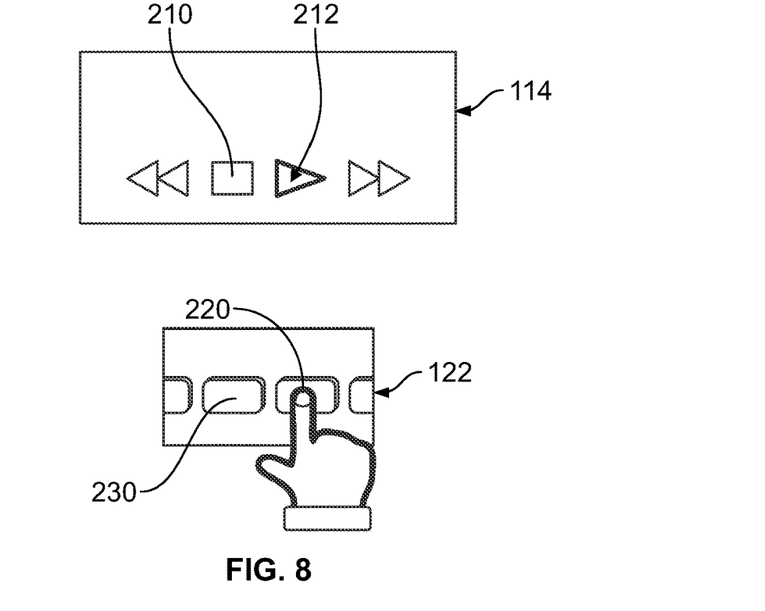
FIG. 8 illustrates the display device and the touchpad shown in FIG. 5 during another touching operation.

FIG. 8 illustrates the display device 114 and the touchpad 122 during another touching operation, such as after the press action. After the press action and execution of the particular function control, the display device 114 displays different display icons 210 and the touchpad 122 provides different virtual buttons 230 associated with the new display icons 210. One of the new display icons 210 defines an active display icon 212 and the virtual buttons 230 are arranged accordingly with the location of the user's finger 220 (such as the location from the press action) establishing the home location. The user may then perform a new action, such as a swipe action to move to a new virtual button 230, a press action to activate the current virtual button 230, remove their finger 220 from the touchpad 122, or another type of action.

Figure 9:
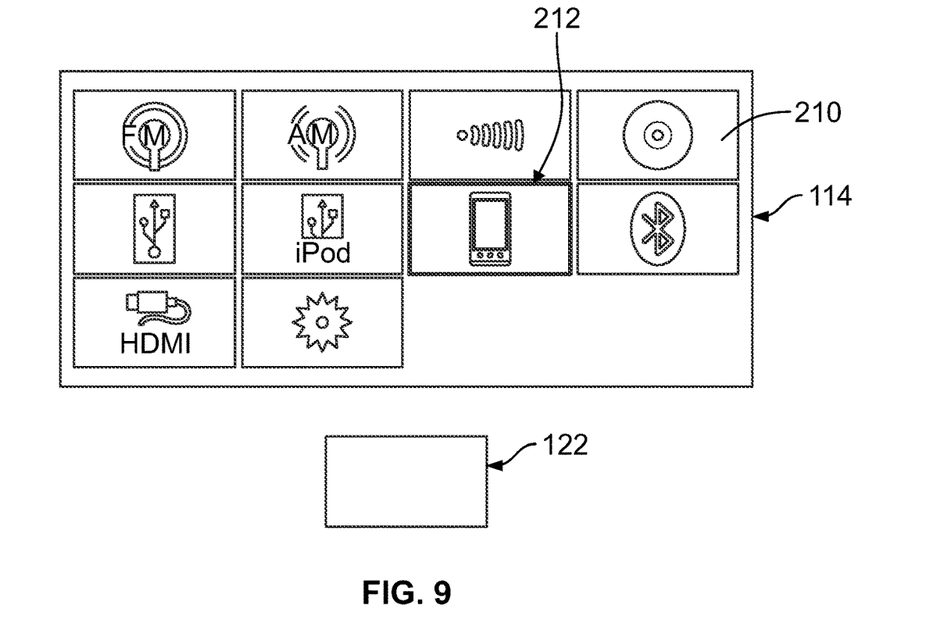
FIG. 9 illustrates the display device and the touchpad shown in FIG. 5 during another touching operation.
Figure 10:
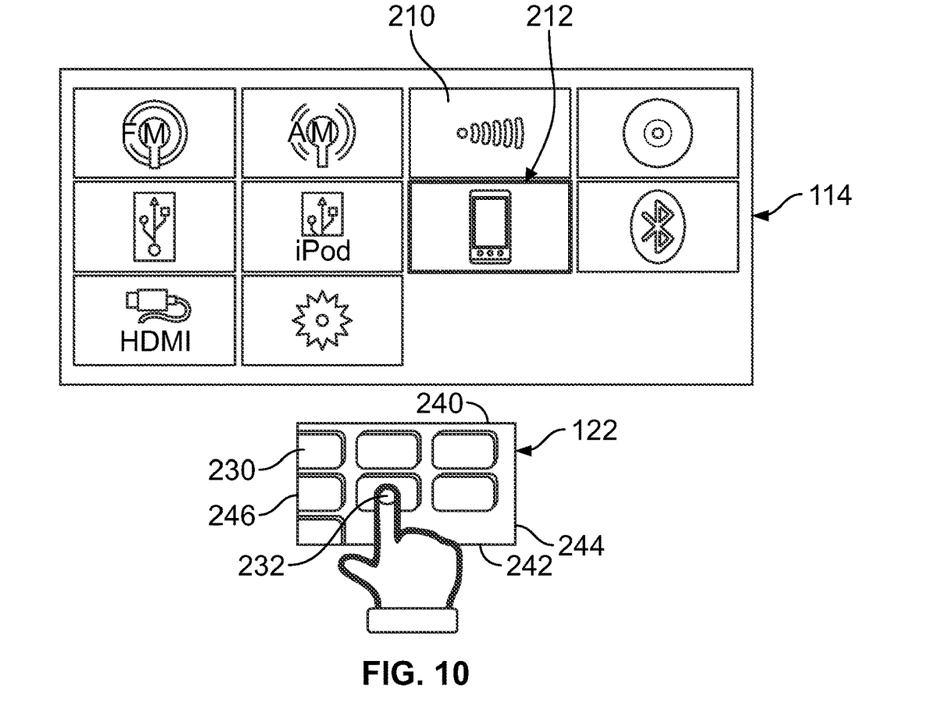
FIG. 10 illustrates the display device and the touchpad shown in FIG. 5 during another touching operation.

FIGS. 9 and 10 illustrates the display device 114 and the touchpad 122 during another touching operation, such as after the swipe action to select the new active display icon 212 (FIG. 7) and after the user stopped touching the touchpad 122. When the user removes his/her finger from the touchpad 122, the touchpad 122 may go blank and be devoid of any virtual buttons 230 (FIG. 9). FIG. 9 shows the display device 114 and the touchpad 122 immediately prior to the user touching the touchpad 122. FIG. 10 shows the display device 114 and the touchpad 122 immediately after the user touches the touchpad 122.

The user is able to touch anywhere on the touchpad 122. After the user touches the touchpad 122 (represented by a tip of the user's finger 220), the virtual buttons 230 are provided on the touchpad 122. The virtual buttons 230 correspond to the display icons 210 and have relative orientations corresponding to the display icons 210. The touchpad 122 establishes the home location 232 on the touchpad 122 at the location where the user first touches the touchpad 122. In the illustrated embodiment, the home location 232 is approximately in the same home location 232 as illustrated in FIG. 6; however, because a different display icon 210 is currently the active display icon 212 (as compared to FIG. 6), the arrangement of the virtual buttons 230 in FIG. 10 is different than the arrangement of the virtual buttons 230 in FIG. 6.

Figure 11:
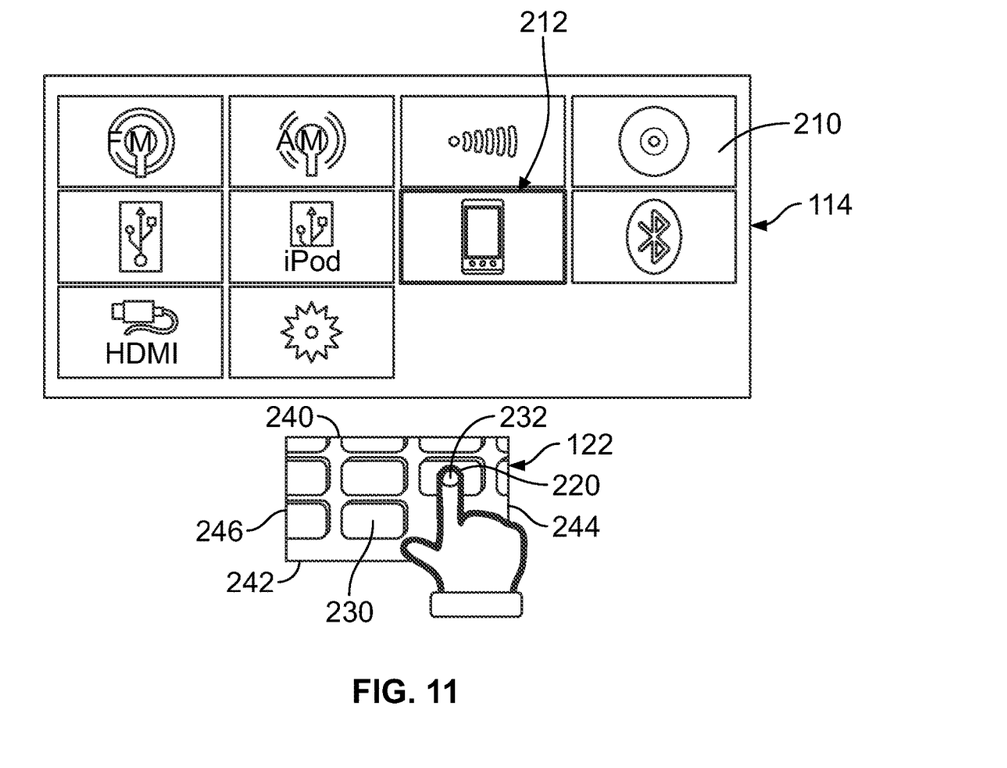
FIG. 11 illustrates the display device and the touchpad shown in FIG. 5 during another touching operation.

FIG. 11 illustrates the display device 114 and the touchpad 122 during another touching operation, such as after the user stopped touching the touchpad 122 but then retouches the touchpad 122 in a different location than the location shown in FIG. 10. After the user touches the touchpad 122 (represented by a tip of the user's finger 220), the virtual buttons 230 are provided on the touchpad 122. The virtual buttons 230 correspond to the display icons 210 and have relative orientations corresponding to the display icons 210.

The active display icon 212 is the same in FIG. 11 as in FIG. 10; however the home location 232 shown in FIG. 11 is different than the home location 232 shown in FIG. 10. Because the home location 232 in FIG. 11 is different than the home location 232 in FIG. 10, the arrangement of the virtual buttons 230 in FIG. 11 is different than the arrangement of the virtual buttons 230 in FIG. 10. For example, in FIG. 11, the user touches the touchpad 122 closer to the right side 244 and closer to the top 240 of the touchpad 122 as compared to FIG. 10 where the user touches the touchpad 122 closer to the left side 246 and closer to the bottom 242. The touchpad 122 establishes the home location 232 closer to the right side 246 and the top 240 in FIG. 11, but establishes the home location 232 closer to the left side 246 and the bottom 242 in FIG. 10. The virtual button 230 associated with the active display icon 212 is positioned closer to the right side 246 and the top 240 in FIG. 11 whereas the virtual button 230 associated with the active display icon 212 is positioned closer to the left side 246 and the bottom 242 in FIG. 10.

Embodiments described herein provide a touchpad 122 that provides configurable, tactile virtual buttons 230. For example, placement of a user's finger 220 on the touchpad 122 sets a home location 232 that defines other selectable controls, such as setting tactile bumps around the location of the virtual button 230, and thus the finger and around other virtual buttons 230 that are centered or positioned around the home location 232. The touchpad 122 allows a sliding operation to be performed to change the active display icon 210 on the display device 114. The touchpad 122 sets the home location 232 on the touchpad 122 corresponding to the highlighted active display icon 210. Once set, other virtual buttons 230 are defined on the touchpad 122 based on the location of the other display icons 210 and relative to the active display icon 212. A user can then swipe from one virtual button 230 across or to another virtual button 230 along the touchpad 122 and a different active display icon 212 is then selected on the display device 114. A user can then define a new home location 232 by removing his/her finger from the touchpad 122 and then again placing his/her finger on another location of the touchpad 122. Touch input location is irrelevant as the touchpad 122 will establish the home location 232 wherever is most convenient for the user to touch. Thus, a user can safely and easily navigate the user interface display device 114 with intuitive touching operations and tactile feedback on the touchpad 122. An intelligent touchpad 122 with a flexible, dynamic interface that a user can easily operate is provided.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the Willis "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:
1. A vehicle control system comprising:
a display device located in a vehicle, the display device displaying a plurality of display icons with one of the display icons representing an active display icon; and
a touchpad located in a center console of the vehicle and remote from the display device, the touchpad providing virtual buttons corresponding to the display icons and having relative orientations corresponding to the display icons, wherein the touchpad establishes a home location on the touchpad based on a location where a user of the vehicle touches the touchpad, the home location corresponding to the active display icon such that a virtual button representing the active display icon is located at the home location and other virtual buttons are oriented about the home location, wherein the touchpad generates the virtual buttons in response to the home location being established such that the virtual buttons are oriented based on a relative orientation of the plurality of display icons, wherein the touchpad forms three-dimensional contours on a surface of the touchpad that correspond to the virtual buttons, wherein the three-dimensional contours raise up from the surface of the touchpad to form the virtual buttons in response to the home location being established, wherein the touchpad senses a swipe action by the user along the touchpad from the virtual button representing the active display icon to a different virtual button, and wherein the display device activates the display icon associated with the different virtual button to a new active display icon.

2. The vehicle control system of claim 1, wherein the locations of the virtual buttons are not fixed at pre-set locations relative to the touchpad.

3. The vehicle control system of claim 1, wherein the locations of the other virtual buttons are centered about the home location each time the user touches the touchpad.

4. The vehicle control system of claim 1, wherein the locations of the virtual buttons change when a new display icon becomes the active display icon.

5. The vehicle control system of claim 1, wherein the touchpad includes a top, a bottom, a right side and a left side, and wherein the touchpad establishes the home location at any location relative to the top, bottom, right side and left side based on where the user of the vehicle touches the touchpad.

6. The vehicle control system of claim 5, wherein, at a first touch, the touchpad establishes the home location closer to the right side than the left side such that the virtual button associated with the active display icon is positioned closer to the right side than the left side, and at a second touch, the touchpad establishes the home location closer to the left side than the right side such that the virtual button associated with the active display icon is positioned closer to the left side than the right side.

7. The vehicle control system of claim 5, wherein, at a first touch, the touchpad establishes the home location closer to the top than the bottom such that the virtual button associated with the active display icon is positioned closer to the top than the bottom, and at a second touch, the touchpad establishes the home location closer to the bottom than the top such that the virtual button associated with the active display icon is positioned closer to the bottom than the top.

8. The vehicle control system of claim 1, wherein a subsequent touch of the touchpad by the user establishes the home location on the touchpad corresponding to the new active display icon.

9. The vehicle control system of claim 1, wherein the locations of the virtual buttons on the touchpad remain fixed during the swipe action.

10. The vehicle control system of claim 1, wherein the display device highlights the active display icon to indicate to the user which display icon is the active display icon, and wherein the active display icon becomes un-highlighted after the swipe action while the new active display icon becomes highlighted after the swipe action.

11. The vehicle control system of claim 1, wherein the display icons are arranged in rows and in columns, the virtual buttons being arranged in rows and in columns.

12. The vehicle control system of claim 1, wherein the touchpad provides fewer virtual buttons than display icons displayed on the display device.

13. The vehicle control system of claim 1, wherein the touchpad includes a pressure sensor configured to sense a press action on the virtual button on the touchpad, the vehicle control system executing a control function associated with the virtual button pressed during the press action.

14. The vehicle control system of claim 1, wherein the touchpad senses a press action on the virtual button on the touchpad, the vehicle control system executing a control function associated with the virtual button pressed during the press action, the display device displaying different display icons, the touchpad providing different virtual buttons associated with the display icons.

15. The vehicle control system of claim 1, wherein the touchpad provides tactile response to the user as the user moves along the virtual buttons on the touchpad.

16. The vehicle control system of claim 1, wherein, when the user touches the touchpad, the virtual buttons are provided, and wherein, when the user does not touch the touchpad, the touchpad does not provide virtual buttons.

17. The vehicle control system of claim 1, wherein, at a first touch, when a first display icon of the plurality of display icons is the active display icon, the touchpad provides the virtual buttons in a first arrangement, and at a second touch at the same location on the touchpad as the first touch, when a second display icon of the plurality display icons is the active display icon, the touchpad provides the virtual buttons in a second arrangement different than the first arrangement.

18. The vehicle control system of claim 1, wherein, at a first touch, when a first display icon of the plurality of display icons is the active display icon, the touchpad provides the virtual buttons in a first arrangement, and at a second touch at a different location on the touchpad as the first touch, when the first display icon is the active display icon, the touchpad provides the virtual buttons in a second arrangement different than the first arrangement.

19. A method for controlling functions of a vehicle control system, the method comprising:
presenting, to a user of a vehicle, a first display on a display device, the first display displaying a plurality of display icons corresponding to control functions of the vehicle control system, one of the display icons being an active display icon;
receiving a touch input from the user on a touchpad of a control panel that is located in a center console of the vehicle and remote from the display device, the touch input establishing a home location at the location of the touch input of the user;
generating, in response to the home location being established, virtual buttons on the touchpad corresponding to the display icons, wherein a virtual button corresponding to the active display icon is located at the home location and other virtual buttons corresponding to other display icons are oriented relative to the home location, wherein the virtual buttons are generated such that the virtual buttons are oriented based on a relative orientation of the plurality of display icons, and wherein generating virtual buttons on the touchpad includes forming three-dimensional contours on a surface of the touchpad that correspond to the virtual buttons, wherein the three-dimensional contours raise up from the surface of the touchpad to form the virtual buttons in response to the home location being established;
receiving a swipe action from the user along the touchpad where the user moves from the virtual button representing the active display icon to a different virtual button; and
changing the display on the first display of the display device to highlight a new active display icon associated with the different virtual button.

20. The method of claim 19, further comprising:
removing the virtual buttons from the touchpad after the user removes the touch input;
receiving a second touch input from the user on the touchpad at a different location than the first touch input to establish a new home location; and
providing virtual buttons on the touchpad oriented relative to the new home location.

21. The method of claim 19, further comprising:
removing the virtual buttons form the touchpad after the user removes the touch input;

receiving a second touch input from the user on the touchpad to establish a new home location; and providing virtual buttons on the touchpad, wherein the virtual button corresponding to the new active display icon is located at the new home location.

22. The vehicle control system of claim 1, wherein the virtual buttons are not graphically displayed on the touchpad.

23. The vehicle control system of claim 1, wherein the touchpad forms the three-dimensional contours in front of, behind, and on both sides of the location where the user touches the touchpad.

\* \* \* \* \*